United States Patent [19]

Baumann

[11] Patent Number: 5,660,729
[45] Date of Patent: Aug. 26, 1997

[54] FILTER CARTRIDGE FOR A FILTER FOR FILTERING LIQUID OR GASEOUS MEDIA

[75] Inventor: Dieter Baumann, Greven, Germany

[73] Assignee: Ing. Walter Hengst GmbH & Co. KG, Muenster, Germany

[21] Appl. No.: 684,324

[22] Filed: Jul. 19, 1996

Related U.S. Application Data

[63] Continuation of Ser. No. 289,747, Aug. 12, 1994, abandoned.

[30] Foreign Application Priority Data

| Aug. 12, 1993 | [DE] | Germany | 9312051 U |
| May 11, 1994 | [DE] | Germany | 44 16 577.3 |

[51] Int. Cl.⁶ ........................................... B01D 27/06
[52] U.S. Cl. .................. 210/457; 210/461; 210/484; 210/487; 210/493.2
[58] Field of Search .................. 210/356, 437, 210/450, 457, 459, 460, 461, 484, 485, 487, 488, 489, 493.1, 493.2, 493.5, 497.01; 55/492, 498, 505, 510, 521

[56] References Cited

U.S. PATENT DOCUMENTS

| 3,457,339 | 7/1969 | Pall et al. ........................... 264/162 |
| 4,521,309 | 6/1985 | Pall ................................... 210/493.2 |
| 4,536,291 | 8/1985 | Hoffmann et al. ................. 210/484 |
| 4,956,089 | 9/1990 | Hurst ................................. 210/493.2 |
| 5,045,192 | 9/1991 | Terhune ............................ 210/493.2 |
| 5,211,846 | 5/1993 | Kott et al. ......................... 210/493.2 |
| 5,250,179 | 10/1993 | Spearman ........................ 210/493.2 |

FOREIGN PATENT DOCUMENTS

| 2163368 | 2/1986 | United Kingdom | 210/450 |
| 2226254 | 6/1990 | United Kingdom | 210/450 |

*Primary Examiner*—Matthew O. Savage
*Attorney, Agent, or Firm*—Hill, Steadman & Simpson

[57] ABSTRACT

The invention relates to a filter cartridge for a filter for filtering liquid or gaseous media comprising two front disks and a substantially hollow cylindrical filter member arranged inbetween the two front disks, with the medium to be filtered flowing through the filter member, with at least one of the front disks provided with a central aperture whereby the filter cartridge is axially mountable onto a medium inlet pipe or outlet pipe with at least one seal sealingly positioned inbetween, and wherein the filter cartridge is detachable from the pipe for replacement. The filter cartridge is designed as a replacement filter cartridge for replacing common filter cartridges having metal parts, wherein the filter consists of paper and/or cotton and/or felt and/or thermally usable plastic non-woven fabric, wherein the front disks and formed of thermally consumable plastic and the seal is formed of a flexible thermally consumable material.

24 Claims, 4 Drawing Sheets

FILTER CARTRIDGE FOR A FILTER FOR FILTERING LIQUID OR GASEOUS MEDIA

This is a continuation of application Ser. No. 08/289,747, now abandoned, filed Aug. 12, 1994.

BACKGROUND OF THE INVENTION

The invention relates to a filter cartridge for a filter for filtering liquid or gaseous media comprising two front disks and a substantially hollow cylindrical filter member arranged inbetween the two front disks, with the medium to be filtered flowing through the filter member, with at least one of the front disks provided with a central aperture whereby the filter cartridge is axially mountable onto a medium inlet pipe or outlet pipe with at least one seal sealingly positioned inbetween, and wherein the filter cartridge is detachable from the pipe for replacement.

Filter cartridges of the kind mentioned are widely used in filters for liquid or gaseous media, e.g. oil, fuel or air, and are known therefrom. With these known filter cartridges at least the front disks are made of metal, e.g. tinplate or aluminum. These metallic front disks are commonly manufactured by stamping, pressing or deep drawing. Also, a supporting body often arranged in the interior of the filter member commonly is made of metal, usually of an apertured pipe. Also, a jacket surrounding the filter member at the outside, and often present at the filter cartridge, consists of the same material, with the jacket protecting the filter member against mechanical influence from the outside and also supporting it towards the outside.

The described filter cartridges are worn out after a certain time of operation, which means that they are loaded with particles filtered out of the medium to be filtered, such that a further use is not possible. In most cases such filter cartridges are not cleaned and reused but are disposed into the garbage. It is a disadvantage in particular, that with the deposition of such filter cartridges a relative large volume at the dump site is used due to the bulk of the filter, even though a significant amount of that volume comprises air spaces within the filter. Also, when burning these filter cartridges with the garbage, the metal parts remain as residue after the incineration process and still consume some significant volume of the dumping area, although a smaller one.

SUMMARY OF THE INVENTION

Therefore, it is an object of the invention to provide a filter cartridge which after the end of its useful life, may be deposited such that no significant volume of residue remains which would consume volume at the dumping area or would contaminate the environment, wherein the new filter cartridge is to be used in known filters without the necessity of changes in the construction thereof.

This object is attained according to the invention by a filter cartridge designed as a replacement filter cartridge for replacing common filter cartridges comprising metal parts, wherein the filter member consists of paper and/or cotton and/or felt and/or thermally consumable plastic non-woven fabric, wherein the front disks consist of thermally consumable plastic and the seal consist of a flexible thermally consumable material.

It is advantageously attained by the embodiment of the filter cartridge according to the invention as a replacement filter cartridge and by the special selection of material and combination thereof for the various parts of the filter cartridge, that on one hand, the new filter cartridge may be used instead of the formerly used filter cartridges containing metal parts, in particular without the necessity of changes at the respective filter, and that on the other hand, the new filter cartridge may be completely incinerated to ashes at the end of its useful life when the filter cartridge, after having been used as intended, is incinerated in the garbage. Such a filter cartridge, after the incineration thereof, leaves practically no residues to be deposited, wherein advantageously such filter cartridges may be used instead of, e.g., heating oil as fuel. The use as a filter cartridge in the intermediate time is only an intermediate step for using the raw material oil.

For supporting the filter member against the forces which act towards the outside when the medium flows through the filter, and for protecting the filter member during storage, the filter member advantageously is surrounded at the outside thereof by an apertured or grid-shaped jacket 0f paper or cardboard or thermally consumable plastic foil. This jacket also may be fully incinerated to ashes such that it will not create significant residues during the incineration thereof which have to be deposited.

For receiving the forces resulting from the medium flowing through the filter member and directed from the outside thereof to the inside, substantially radially to the inside, it is provided that in the interior of the filter member a supporting body is arranged, preferably consisting of thermally consumable plastic material. Therefore a filter cartridge provided with a supporting body forming an integral member of the cartridge may be fully incinerated to ashes. As an alternative, the filter cartridge may be designed such that it will receive a supporting body provided at the side of the filter housing as soon as the filter cartridge is mounted in the filter housing. In this case the material of the supporting body provided at the side of the filter housing may be freely chosen and may consist of, e.g., metal such as aluminum, in case the filter housing also is made of aluminum.

The supporting body arranged in the interior of the filter member preferably has the shape of a hollow cylindrical grid since this grid provides a good relation of supporting effect on the one hand and use of material and area on the other hand.

Additional advantageous embodiments and further developments of the filter member are described below.

In order to keep the manufacturing effort for mounting the filter cartridge low, the supporting body preferably is loosely arranged in the interior of the filter member between the front disks. In this way it is assured, without further means, that the supporting body is firmly positioned in the interior of the filter member.

In order to avoid using a glue or sealing compound for connecting the two front disks and the filter member, it is proposed that the two front disks are connected with the filter member by a thermal welding connection in a sealing mode.

The seal or seals, respectively, provided at the filter cartridge according to the invention, may be differently designed as regards the material, shape and kind of the connection with the front disk or the front disks, respectively.

The weldings in the filter cartridge, in particular between the front disks and the filter member, and between the front disk or front disks, respectively, and seal or seals, respectively, are preferably attained by light beam welding or mirror welding or ultrasonic welding or microwave welding. The welding processes mentioned have been proven successful in practical operation, e.g. when manufacturing plastic window frames, and therefore are also usable for the production of filter cartridges according to the invention.

A contribution for reducing garbage volumes may be made by the filter cartridge according to the invention, in that the plastic material at least partially contains recycled material.

In order to attain the necessary strength of the parts of the filter cartridge made of plastic, in particular with high mechanical and/or thermal loads, it is provided that the plastic contains glass fibers.

Furthermore it is provided that the front disks, the supporting body, the plastic non-woven fabric of the filter member eventually present, the jacket eventually present, and the seal eventually consisting of plastic, consist of the same plastic and recycled material. Hereby it is attained, that a filter cartridge, after the use thereof, may be easily recycled because it consists of a plastic material of the same kind throughout such that no costly designation of the material and sorting of the individual filter cartridges is necessary.

A suitable plastic for the parts of the filter cartridge consisting of plastic is polyamide because this plastic is mechanically stable to the degree necessary and is resistant against most of the media to be filtered and therefore may be incinerated without damage to the environment.

Finally, it is preferably provided that the filter member is formed of a filter cloth path folded in zig-zag fashion. Hereby on the one hand high stability is attained and on the other hand a large filter area is provided.

Since the filter cartridge according to the invention is not restricted regarding the geometric design and dimensioning, such a filter cartridge may be used instead of practically all commonly used filter cartridges containing metal parts, without any changes of the components cooperating with the filter cartridge, e.g. filter housings.

BRIEF DESCRIPTION OF THE DRAWINGS

In the following embodiments of the invention are explained referring to a drawing. The figures of the drawing illustrate various aspects and embodiments of the invention.

DETAILED DESCRIPTION OF THE PREFERRED EMBODIMENTS

Figure 1:
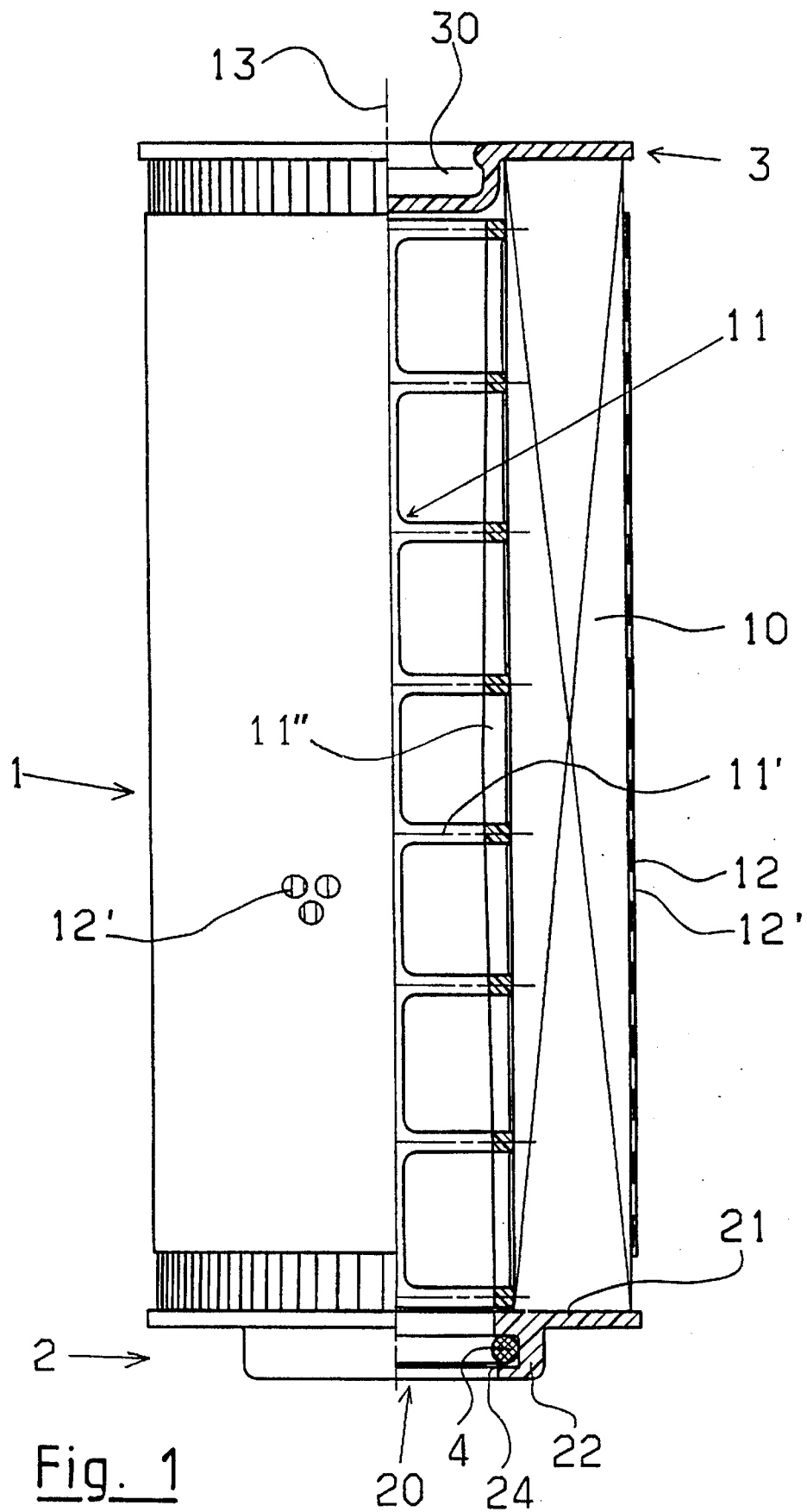
FIG. 1 is a filter cartridge where the left half thereof is illustrated in elevation and where the right half is illustrated in a longitudinal section.

As illustrated in FIG. 1 of the drawing, a filter cartridge 1 consists of a filter member 10 which in this case is a zig-zag shaped folded bellows, of two front disks 2 and 3 covering the filter member 10 on top and at the bottom, a grid shaped perforated annular supporting body 11 arranged in the interior of the filter member 10, and an apertured or perforated jacket 12 surrounding the filter member 10 at the outside thereof.

The filter member 10 comprises a hollow cylindrical base shape wherein the edges of the folds extend in axial direction, i.e. in a direction in parallel with a longitudinal central axis 13 of the filter cartridge 1. The filter member 10 is sealingly connected or bonded, for example glued, with annular planar surfaces of the two front disks 2 and 3 at the two front ends thereof.

The lower front disk 2 comprises a central aperture 20 by means of which the filter cartridge 1 may be mounted on a medium inlet or outlet pipe forming a part of the filter. For sealing this detachable connection a circumferential annular ring 4 is provided, in this case an O-ring of elastomer. This annular ring 4, is arranged with an axial and/or radial clearance in a groove 24 which is formed in the lower front disk 2. For this reason, the front disk 2 comprises a flat annular member 21 at the upper side thereof, i.e. at the side facing the filter member 10, with a web 22 extending from the underside of the annular member 21 downwards, and with the web 22 extending firstly axially and secondly radially inwards, with the web 22 forming the groove 24 at the radially inner side facing the aperture 20. Alternatively, the seal and the front disks may be joined together in a manner such as being welded, glued or jammed with each other.

The upper front disk 3, in this embodiment of the filter cartridge 1, is designed closed and provides in the central area thereof a snap-in indentation 30 on an outer side thereof for receiving the corresponding snap-in element of a screwable lid of an associated filter housing or a tool, and provides an abutment surface for abutting the upper end of the supporting body.

The supporting body 11 arranged in the interior of the filter member 10 in the embodiment illustrated comprises the shape of a hollow cylindrical grid formed of grid struts 11' and 11". The grid struts 11' therein extend in circumferential direction, and the struts 11" extend in longitudinal direction of the supporting body 11 with the struts 11' radially extending beyond the struts 11" to a certain extent. A length of the supporting body is less than a distance between the abutment surface of the upper disc 3 and the annular planar surface of the lower disc 2, and an outer diameter of the lower end of the supporting body is greater than an inner diameter of the central aperture 20 such that the lower end of the supporting body is configured to abut the annular planar surface of the lower disk 2 and the upper end of the supporting body is configured to abut the abutment surface of the upper disk 3. The filter cartridge excludes any rigid connections between the supporting body and the upper disk 3 and between the supporting body and the lower disc 2 such that the supporting body 11 is loosely arranged in the interior of the filter member 10 and between the front disks 2 and 3, and such that the supporting body does not cross the planes of the annular planar surfaces of the front disks within the interior of the filter member. When the filter member 10 is provided with a fluid flow in radial direction from the outside to the inner side, the supporting body 11 will support the filter member 10 at the inner circumference thereof by means of the struts 11' extending in circumferential direction of the supporting body, and a collapse of the filter member 10 resulting from pressure differentials of the medium to be filtered and flowing through the filter cartridge 1 is avoided.

As further illustrated in the drawing, the two front disks 2 and 3, as well as the supporting body 11, arranged in the interior of the filter cartridge 1, consist of plastic material, wherein all three members mentioned in this case are made by plastic injection molding, e.g. of polyamide, which may be mixed with recycled material and/or glass fibers. Thereby the filter cartridge 1 is also usable for recycling used plastic material.

Preferably the filter member 10 consists of paper and/or cotton and/or felt and/or plastic non-woven fabric wherein the latter also consists of a plastic thermally consumable without any significant residue.

The jacket 12 surrounding the filter member 10 at the outside thereof, along the largest extent of the axial length thereof, preferably consists of paper or cardboard in which apertures 12' are provided in a pattern which is dense and at the same time provides for a sufficient flow cross-section. In the left part of the filter cartridge 1 illustrated in the drawing only a small number of these apertures 12' are shown for simplifying the illustration.

Figure 2:
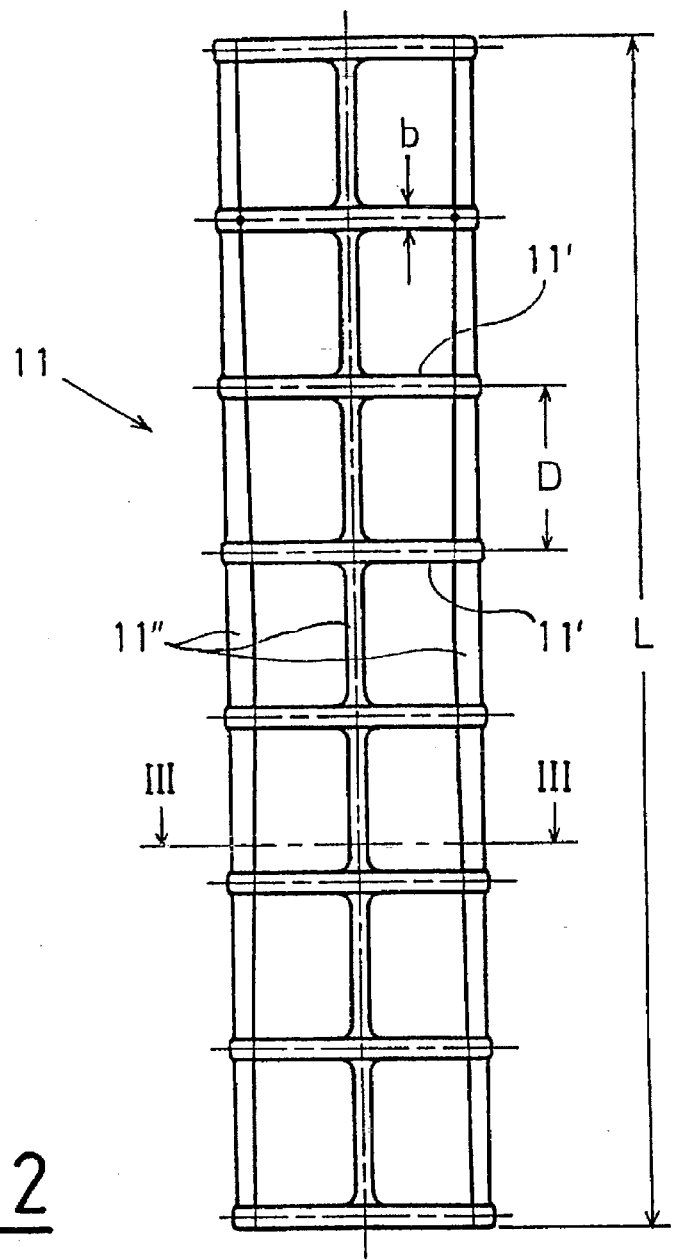
FIG. 2 is a supporting body of the filter cartridge of FIG. 1 in a side elevational view.

FIG. 2 of the drawing illustrates the supporting body 11 of the filter cartridge 1 according to FIG. 1 as an individual part in a lateral view wherein the structure of the grid is illustrated in great detail. In the embodiment shown the supporting body 11 in total comprises eight grid struts 11' extending in circumferential direction and four grid struts 11" extending in longitudinal direction of the supporting body 11. Also here it is illustrated, that the grid struts 11' radially protrude in outward direction beyond the grid struts 11". Therein the grid struts 11' radially support the filter member, whereas the struts 11" mainly connect the struts 11' with each other.

The relation between a width or thickness b of the grid struts 11' and a distance D between two adjacent grid struts 11' in longitudinal direction of the supporting body 11 preferably is between 1:4 and 1:8. The relation between the distance D between two adjacent grid struts 11' as seen in longitudinal direction of the supporting body 11 and a length L of the supporting body 11 preferably is between 1:6 and 1:12. By this means a large free flowing cross-section and low consumption of plastic, as well as a sufficient stability of the supporting body 11, are attained.

Figure 3:
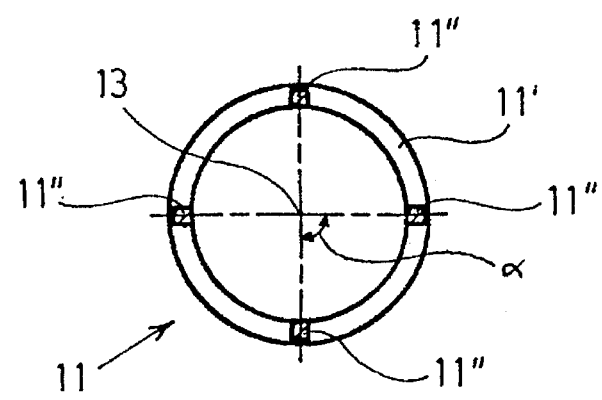
FIG. 3 is the supporting body of FIG. 2 in a cross-sectional view along the line III—III.

The arrangement of the grid struts 11" extending in longitudinal direction of the supporting body 11 as shown in FIG. 3 of the drawing, as a cross-section along the line III—III in FIG. 2 in the embodiment illustrated, have an angle distance α of 90° between each other, thus there are four parallel grid struts 11" extending in longitudinal direction of the supporting body. With smaller diameter supporting bodies two or three grid struts 11" may be sufficient, and with larger diameter supporting bodies 11 advantageously up to eight grid struts 11" are provided in longitudinal direction of the supporting body 11.

Figure 4:
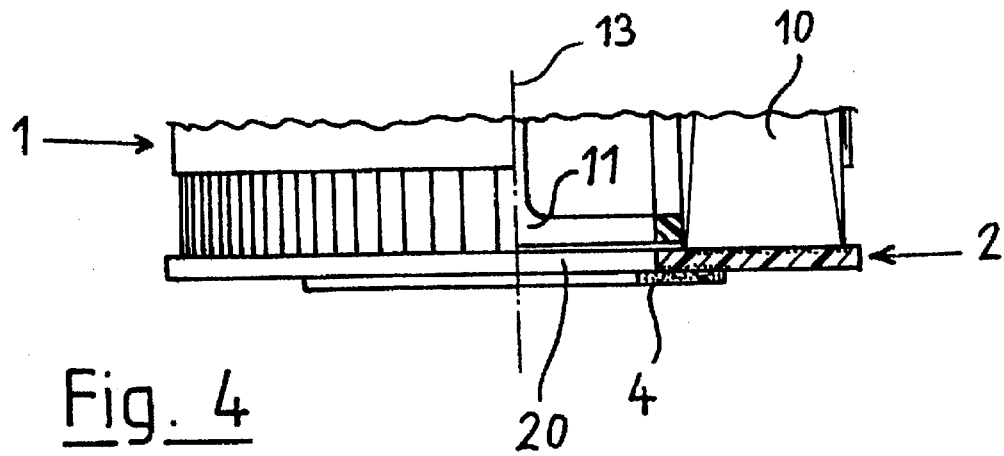
FIG. 4 is the lower part of a second embodiment of the filter cartridge in partial elevational and partial sectional view.

FIG. 4 illustrates a filter cartridge 1 wherein the seal 4, other than with the filter cartridge according to FIG. 1, is provided by an annular disk of felt, preferably a polyamide needled felt. The seal 4 is attached at the underside of the lower front disk 2 of the filter cartridge 1 wherein the attachment is attained by a welding connection in this case. For this reason the radial inner part of the underside of the front disk 2 is warmed-up till it gets soft, e.g., by microwave or ultrasonic radiation or by a welding mirror, whereupon the seal 4 is pressed against this softened area. After the cooling and rehardening of the plastic of the front disk 2, the seal 4 is firmly and durably connected with the front disk 2.

As furthermore is clear from FIG. 1, the free inner diameter of the seal 4 is smaller than the free inner diameter of the central aperture 20 in the front disk 2. Therefore the seal 4 at the radial inner side extends beyond the inner edge of the front disk 2. The reason for this extension is illustrated in FIG. 5.

Figure 5:
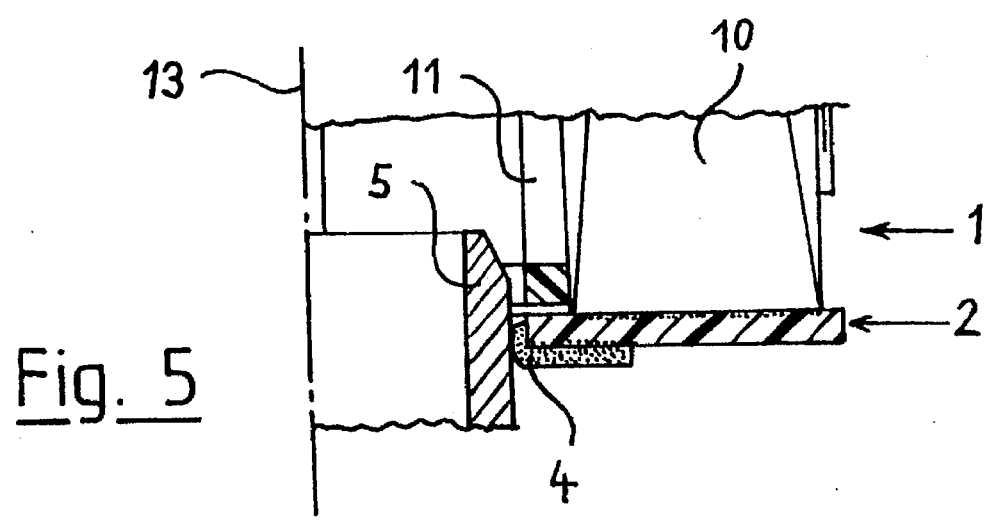
FIG. 5 is the right half of the filter cartridge in FIG. 4 in enlarged scale and shown in a mounted condition in a sectional view.

FIG. 5 illustrates the filter cartridge of FIG. 4 in an enlarged illustration of the right half in relation to the centerline 13 in the mounted condition, wherein the filter cartridge 1 with the lower front disk 2 forward is mounted on a medium outlet pipe 5. The medium outlet pipe 5 is a part of a non-illustrated filter housing receiving the filter cartridge 1. The outer diameter of the pipe 5 is dimensioned such that it is smaller than the free inner diameter of the central aperture 20 in the front disk 2, however, it is larger than the free inner diameter of the seal 4. Furthermore the dimension of the outer diameter of the pipe 5 and the free inner diameter of the front disk 2 are in such a relation, that the annular gap between these two is smaller in radial direction than the thickness of the annular seal 4. Hereby it is attained, that when mounting the filter cartridge 1 from the top onto the pipe 5, the radially inner part of the seal 4 will bend upwards and will be jammed between the outer circumference of the pipe 5 and the inner circumference of the central aperture 20 in the front disk 2. Thereby, on one hand, a sufficiently firm fit of the filter cartridge 1 on the pipe 5 is attained and, on the other hand, such a fargoing compression of the material of the seal 4 is attained, that a sealing against a penetration of the medium to be filtered through the annular gap between the pipe 5 and the front disk 2 is ensured.

Figure 6:
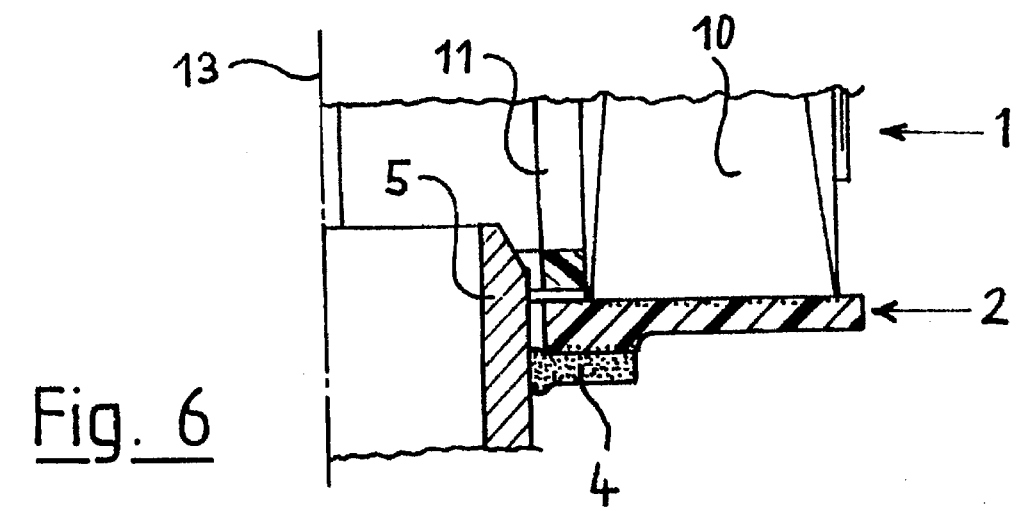
FIG. 6 is a filter cartridge in a third embodiment, also in a mounted condition in the same sectional view as in FIG. 5.

An alternative embodiment of the seal 4a in relation to the one illustrated in FIG. 5 is shown in FIG. 6. Whereas, with the filter cartridge according to FIGS. 4 and 5, the seal 4a comprises a relatively small thickness in axial direction, the thickness of the seal 4a has been chosen considerably larger in the embodiment in FIG. 6. In total, also in this case, the seal 4a comprises a rectangular cross-section and an annular disk form prior to the mounting.

In FIG. 6 the filter cartridge 1 is also illustrated in mounted condition wherein the filter cartridge 1 is mounted on the pipe 5 from the top. Because of the relatively large thickness of the seal 4a the seal will not bend into the gap between the pipe 5 and the front disk 2, however, it will only be compressed and condensed in the radially inner part thereof. Because of the flexibility of the material of the seal 4a also in this case, a sufficiently firm fit of the filter cartridge 1 on the pipe 5 and a sealing of the annular gap between the pipe 5 and the front disk 2 will be attained.

Also with the embodiment according to FIG. 6, the seal 4a is connected with the underside of the lower front disk 2 by a thermal welding which in this case is indicated by a dotted line as in FIGS. 4 and 5.

Also, the connection between the filter member 10 and the front disk 2 is attained by a welding connection in the examples according to FIGS. 4–6, with the welding connection also indicated by dotted lines.

Figure 7:
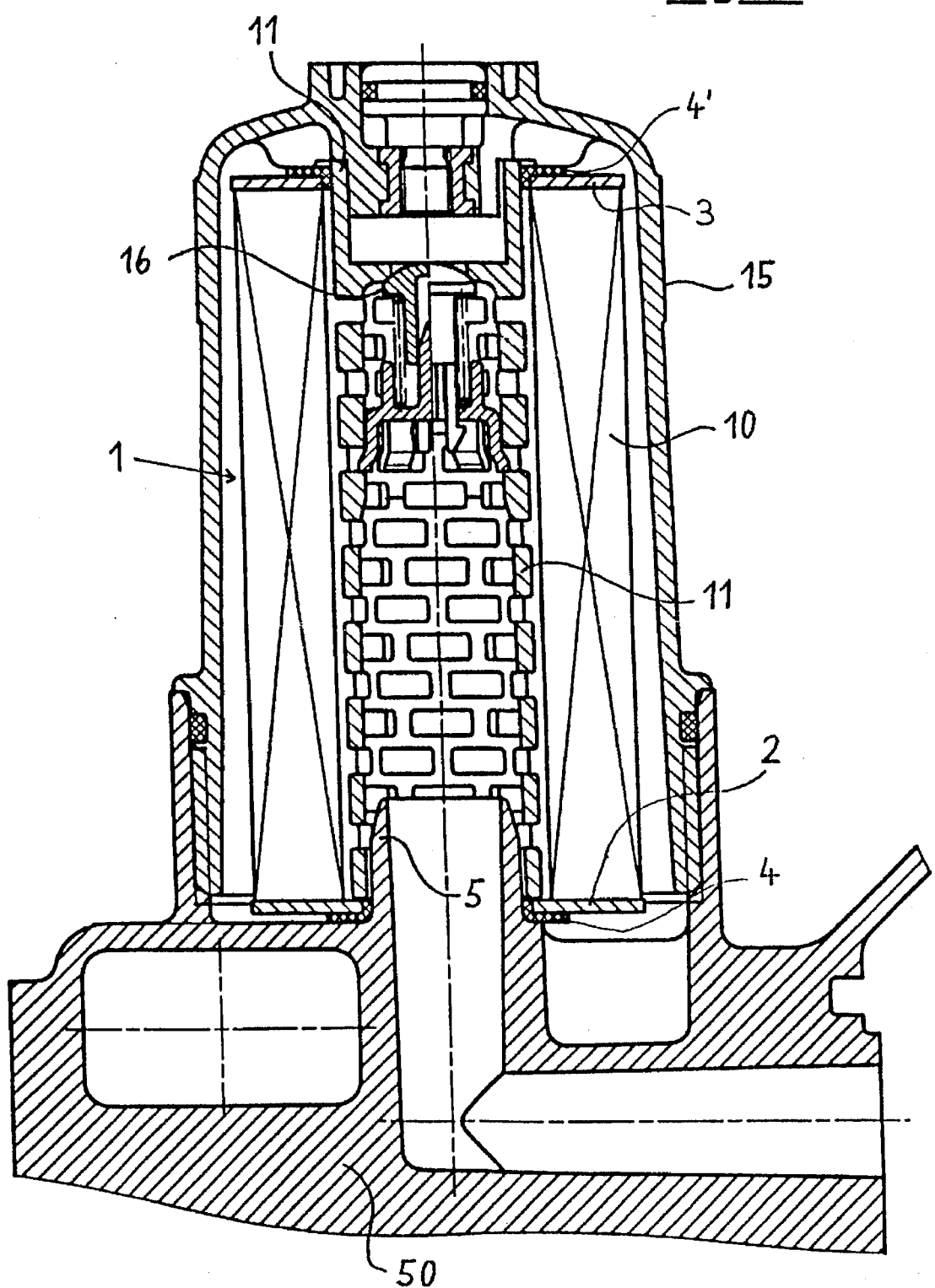
FIG. 7 is a complete filter with a filter cartridge in a fourth embodiment in a longitudinal sectional view.

Finally, FIG. 7 of the drawing illustrates a complete filter wherein a filter cartridge 1 is mounted in a cup-shaped filter housing 15. The cup-shaped filter housing 15 is shaped as a screwable lid and is screwed with the lower end thereof onto a filter base 50. Passages for the inlet and the outlet of the medium to be filtered, which are not designated, extend through the filter base 50 in a known way.

Also in this case, the filter cartridge 1 consists of a filter member 10 having the form of a zig-zag folded filter cloth path, and two front disks 2 and 3 covering the filter member 10 on top and at the bottom. Other than in the previously shown embodiments, the two front disks 2 and 3 each have a central aperture and correspondingly a seal 4, 4' is provided at the two front disks 2 and 3. The lower front disk 2 in FIG. 7 is sealingly mounted on a medium outlet pipe 5 with a seal 4 inbetween.

In the interior of the filter member 10 a supporting body 11a is arranged which is grid-like shaped and comprises in the upper part thereof a bypass valve 16 as an integrated component. The medium to be filtered may directly flow through the valve 16 with no contact with the filter member 10 from the outer circumference of the filter member 10 into the interior of the supporting body 11a and from there into the medium outlet pipe 5 when the filter member 10 is not sufficiently permeable, e.g. because of a too long time of operation. The sealing necessary at the upper end of the filter cartridge 1, between the upper front disk 3 and the upper end of the central supporting body 11a, is provided by the seat 4'. The function of the seal 4' therein corresponds with that of the seal 4 as described in FIG. 5.

The spatial orientation of the filter and the filter cartridge 1 arranged therein has no bearing on the function and may be freely chosen.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

I claim as my invention:

1. A filter cartridge for a filter mountable onto a medium inlet pipe or outlet pipe for filtering liquid or gaseous media comprising:

a first front disk having a central aperture bounded by an annular planar surface, a second front disk that is imperforate and including an abutment surface surrounded by an annular planar surface, a substantially hollow cylindrical filter member coaxially arranged about a central axis and having first and second opposed ends axially spaced apart along said central axis and defining a hollow interior, wherein the annular planar surface of said first front disk is bonded to the first end of said filter member and the annular planar surface of said second front disk is bonded to the second end of said filter member, wherein the annular planar surface of said first front disk and the abutment surface of said second front disk are separated apart from one another by a first distance, and a perforated annular supporting body of thermally consumable plastic coaxially surrounding said central axis and positioned within the hollow interior of said filter member, said supporting body having first and second opposed ends defining a length of said supporting body, said first end defining an outer diameter, wherein the length of said supporting body is less than said first distance and the outer diameter of said first end is greater than an inner diameter of said central aperture, and wherein the first end of said supporting body is configured to abut the annular planar surface of said first front disk and the second end of said supporting body is configured to abut the abutment surface of said second front disk, wherein filter cartridge excludes any rigid connections between said supporting body and said first front disk and between said supporting body and said second front disc such that said supporting body is loosely arranged relative to the front disks in an interior of the filter member between the two front disks, and such that said supporting body does not cross the planes of said annular planar surfaces of the front disks within the interior of the filter member, with the medium to be filtered flowing through the filter member, wherein said central aperture is configured to receive the medium inlet pipe or outlet pipe, at least one seal attached to said first front disc to be sealingly positioned in between said first front disk and the pipe, and, wherein the filter cartridge is detachable from the pipe for replacement, wherein the filter member is formed of a material selected from the group consisting of paper, cotton, felt, and thermally consumable plastic non-woven fabric, wherein the front disks consist of thermally consumable plastic and the seal consists of a flexible thermally consumable material.

2. A filter cartridge according to claim 1, wherein the filter member at the outside thereof is encompassed with an apertured or grid-shaped jacket of a material selected from the group consisting of paper, cardboard and thermally consumable plastic foil.

3. A filter cartridge according to claim 2, wherein the thermally consumable plastic comprises glass fibers.

4. A filter cartridge according to claim 2, wherein the front disks, the supporting body, the filter member, the jacket and the seal are all formed of the same plastic material.

5. A filter cartridge according to claim 4, wherein said same plastic material is polyamide.

6. A filter cartridge according to claim 1, wherein said supporting body is shaped in form of a hollow cylindrical grid.

7. A filter cartridge according to claim 6, wherein the grid is shaped of grid struts extending rectangularly in relation to each other and circumferentially and longitudinally in relation to said central axis.

8. A filter cartridge according to claim 7, wherein the grid struts extending circumferentially in relation to said central axis protrude radially outwards beyond the grid struts extending longitudinally in relation to said central axis.

9. A filter cartridge according to claim 7, wherein a ratio between a thickness of the grid struts and a distance between two adjacent grid struts, as seen in longitudinal direction of said central axis, is between 1 to 4 and 1 to 8.

10. A filter cartridge according to claim 7, wherein a ratio between a distance between two adjacent grid struts, as seen in longitudinal direction of the supporting body, and a length of said central axis is between 1 to 6 and 1 to 12.

11. A filter cartridge according to claim 7, wherein an angle between each two adjacent grid struts extending in longitudinal direction of said central axis, as seen in circumferential direction of said central axis, is between 45° and 180°.

12. A filter cartridge according to claim 1, wherein the seal is designed as an annular disk wherein an inner diameter of the annular disk is smaller than the central aperture of the first front disk and wherein, when mounting the filter cartridge on the medium inlet or outlet pipe, the annular disk will bend in an inner area thereof and will sealingly be secured between the front disk and the inlet or outlet pipe.

13. A filter cartridge according to claim 1, wherein the seal comprises a cross section having a round shape.

14. A filter cartridge according to claim 1, wherein the seal consists of an elastomer.

15. A filter cartridge according to claim 1, wherein the seal consists of felt.

16. A filter cartridge according to claim 15, wherein the felt is a plastic needled felt.

17. A filter cartridge according to claim 1, wherein the seal is arranged in a groove in the first front disk.

18. A filter cartridge according to claim 17, wherein the seal has an axial and/or radial clearance in the groove.

19. A filter cartridge according to claim 1, wherein the seal is fastened to the first front disk by a fastening means.

20. A filter cartridge according to claim 19, wherein the fastening means is selected from the group consisting of thermal welding and glueing.

21. A filter cartridge according to claim 20, wherein the thermal weldings are accomplished in a manner from the group consisting of light beam welding, mirror welding, ultrasonic welding and microwave welding.

22. A filter cartridge according to claim 1, wherein the thermally consumable plastic at least partially comprises recycled material.

23. A filter cartridge according to claim 1, wherein the filter member is formed of a filter cloth folded in zig-zag fashion.

24. The filter cartridge of claim 1, wherein the bond between the annular planar surface of the first from disk and the first end of the filter member and the bond between the annular planar surface of the second front disk and the second end of the filter member is selected from the group consisting of thermal bonding and gluing.

* * * * *